(12) United States Patent
Walrant

(10) Patent No.: US 10,719,607 B2
(45) Date of Patent: Jul. 21, 2020

(54) DATA INTEGRITY VERIFICATION IN A NON-VOLATILE MEMORY

(71) Applicant: NXP B.V., Eindhoven (NL)

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 374 days.

(21) Appl. No.: 15/924,604

(22) Filed: Mar. 19, 2018

(65) Prior Publication Data

US 2019/0286823 A1  Sep. 19, 2019

(51) Int. Cl.
*G06F 21/57* (2013.01)
*G06F 3/06* (2006.01)
*H04L 9/32* (2006.01)
*G06F 21/80* (2013.01)
*G06F 21/64* (2013.01)

(52) U.S. Cl.
CPC .......... *G06F 21/575* (2013.01); *G06F 3/062* (2013.01); *G06F 3/0653* (2013.01); *G06F 3/0659* (2013.01); *G06F 3/0679* (2013.01); *G06F 21/64* (2013.01); *G06F 21/805* (2013.01); *H04L 9/3236* (2013.01)

(58) Field of Classification Search
CPC ....... G06F 21/575; G06F 3/062; H04L 9/3236
See application file for complete search history.

(56) References Cited

U.S. PATENT DOCUMENTS

| 8,065,512 | B2* | 11/2011 | Khan | G06F 12/1433 |
| | | | | 702/119 |
| 8,332,641 | B2* | 12/2012 | Case | H04L 9/3271 |
| | | | | 713/168 |
| 8,601,170 | B1* | 12/2013 | Marr | G06F 21/572 |
| | | | | 710/15 |
| 9,147,075 | B1  | 9/2015  | Litvin | |

(Continued)

FOREIGN PATENT DOCUMENTS

WO   WO-2016/014919 A1   1/2016

OTHER PUBLICATIONS

Lau, Derek; Freescale Semiconductor Application Note; "Secure Bootloader Implementation" Document No. AN4605; Rev. 0, Oct. 2012; 5 Pages.

(Continued)

*Primary Examiner* — Lynn D Feild
*Assistant Examiner* — Viral S Lakhia
(74) *Attorney, Agent, or Firm* — Daniel D. Hill

(57) ABSTRACT

A method for performing a secure boot of a data processing system, and the data processing system are provided. The method includes: processing a command issued from a processor of the data processing system, the command directed to a memory; determining that the command is a command that causes the memory to be modified; performing cryptographic verification of the memory; and incrementing a first counter in response to the determining that the command is a command that causes the memory to be modified. The data processing system includes a processor, (Continued)

a memory, and a counter. The memory is coupled to the processor, and the memory stores data used by a bootloader during a secure boot. The counter is incremented by a memory controller in response to a command being a type of command that modifies the data stored by the memory.

17 Claims, 4 Drawing Sheets

(56) References Cited

U.S. PATENT DOCUMENTS

| | | | | |
|---|---|---|---|---|
| 9,177,152 | B2* | 11/2015 | Leclercq | G06F 21/575 |
| 9,569,623 | B2* | 2/2017 | Kocher | G06F 21/556 |
| 9,779,248 | B1* | 10/2017 | Gefflaut | G06F 21/575 |
| 2007/0074048 | A1 | 3/2007 | Rudelic et al. | |
| 2015/0074387 | A1* | 3/2015 | Lewis | G06F 21/575 |
| | | | | 713/2 |
| 2015/0370726 | A1* | 12/2015 | Hashimoto | G06F 12/1009 |
| | | | | 711/163 |
| 2017/0090510 | A1* | 3/2017 | Tennant | G06F 1/12 |
| 2018/0046805 | A1* | 2/2018 | Le Roy | G06F 3/0619 |
| 2018/0287771 | A1* | 10/2018 | Srivastava | G06F 13/40 |
| 2018/0307867 | A1* | 10/2018 | Dover | G06F 21/64 |
| 2019/0079877 | A1* | 3/2019 | Gaur | G06F 12/0811 |

OTHER PUBLICATIONS

Chhabra, Siddhartha et al.; "An Analysis of Secure Processor Architectures," Transactions on Computational Science VII, LNCS 5890, Jan. 1, 2010, pp. 101-121, Springer, Berlin, Germany.

Micron "Nonvolatile Memory Security"; Internet: https://www.micron.com/products/nonvolatile-memory-security; 4 pages.

* cited by examiner

DATA INTEGRITY VERIFICATION IN A NON-VOLATILE MEMORY

BACKGROUND

Field

This disclosure relates generally to security, and more specifically to data integrity verification in a non-volatile memory (NVM).

Related Art

Secure boot functionality is often integrated into a data processing system or secure micro-controller (MCU) to verify and guarantee the integrity of the data or executable code (firmware) stored in a NVM. A secure boot may be implemented into a data processing system to prevent the execution of malicious code. Any unauthorized or modified firmware stored in the NVM is detected by the secure boot function.

Some systems may prevent or control access to the NVM. For example, a password may be required to gain access to the NVM. This approach limits the non-volatile memory access to one (or a few) processors, but does not necessarily prevent a malicious application running on those processors to also use the password A secure boot mechanism may be implemented with digital signature verification or similar cryptographic operation to verify the data, or firmware, stored in the NVM. The firmware is signed by an authorized entity and the signature is stored next to the firmware. The signature verification may require a long time to complete and is performed during every secure boot. In some cases, the additional time required to securely boot the system is too restrictive and may have unacceptable consequences. Some applications, such as automotive applications, may be sensitive to start-up time and may not be able to afford the extra delay required for a secure boot.

Therefore, a need exists for data integrity verification during a secure boot process in a data processing system that does not require a long time to complete.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
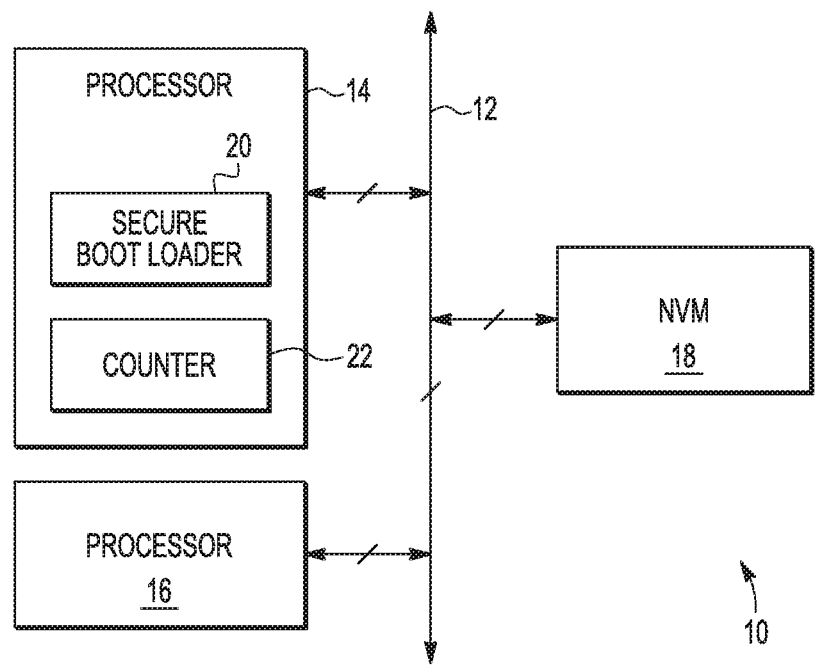
FIG. 1 illustrates a data processing system in accordance with an embodiment.

Generally, there is provided, a data processing system and a method in the data processing system for data integrity verification of an NVM during a secure boot. Instead of cryptographically verifying the data in the NVM at each secure boot, an NVM modification counter is used to log each command sent to the NVM that may cause the data stored in the NVM to be modified. If the counter value from the NVM modification counter does not indicate that a modification command, such as a write command, has been provided to the NVM since the last boot up, then it is assumed the NVM has not been modified, and the device is securely booted without first cryptographically verifying the NVM contents. If the counter value indicates the NVM has been modified, then a cryptographic verification of the NVM is performed. If the verification is successful, then the device is securely booted. Otherwise, the secure boot fails. In one embodiment, the counter is controlled by the NVM controller and modifications of the NVM modification counter is restricted to the NVM controller. The use of a counter value to record modification commands to the NVM significantly reduces the amount of time required for a secure boot of the data processing system when the NVM has not been modified since the last secure boot.

In accordance with an embodiment, there is provided, a method for performing a secure boot of a data processing system, the method including: processing a command issued from a processor of the data processing system, the command directed to a memory; determining that the command is a command that causes the memory to be modified; performing cryptographic verification of the memory; and incrementing a first counter in response to the determining that the command is a command that causes the memory to be modified. The memory may be characterized as being a non-volatile memory. The method may further include incrementing a second counter in response to the cryptographic verification of the memory being successful. The method may further include setting a modification flag to a first logic state in response to incrementing the first counter, wherein the set modification flag indicating that the memory has been modified so that the first counter is not incremented for subsequent modification commands. The method may further include resetting the modification flag to a second logic state in response to a subsequent restart of the data processing system. The memory and the processor may be implemented together on a single integrated circuit. Determining that the command is a command that causes the memory to be modified may further include determining that a first counter value of the first counter is not equal to a second counter value of a second counter, wherein the first counter may be under the control of a memory controller of the memory and the second counter may be under the control of the processor, and wherein the cryptographic verification of the memory may be in response to the first and second counter values not being equal. The method may further include halting the secure boot of the data processing system in response to the cryptographic verification of the memory indicating that the modification of the memory had been unauthorized.

In another embodiment, there is provided, a method for performing a secure boot of a data processing system, the method including: processing a command issued from a processor of the data processing system, the command directed to a memory of the data processing system; determining if the command is a command that causes the memory to be modified; if it is determined that the command is a command that causes the memory to be modified, performing cryptographic verification of the memory and incrementing a first counter; and if it is determined that the command is not a command that causes the memory to be modified, continuing with the secure boot from the memory without performing the cryptographic verification of the memory. Determining if the first command is a command that causes the memory to be modified may further include determining if the first counter has been incremented since a previous secure boot of the data processing system. The method may further include incrementing a second counter in response to the cryptographic verification being successful, wherein determining that the first command is a command that causes the memory to be modified may further include determining if a first count value from the first counter is equal to a second count value from the second counter, and wherein if the first and second count values are not equal, the memory may be determined to have been modified. The method may further include setting a modification flag in response to incrementing the first counter, wherein the setting of the modification flag may prevent the first counter from being further incremented while the modification flag is set. The memory may include a plurality of memory blocks, and wherein each memory block of the plurality of memory blocks may have a corresponding counter, and wherein incrementing the first counter further include incrementing a counter corresponding to a memory block of the plurality of memory blocks that has been modified in response to a command.

In yet another embodiment, there is provided, a data processing system including: a processor having a bootloader for loading data used by the data processing system; a memory coupled to the processor, the memory for storing the data loaded by the bootloader; and a first counter coupled to a memory controller of the memory, the first counter being incremented by the memory controller in response to a command being determined to be a command that modifies the data stored by the memory. The data processing system may be implemented on a single integrated circuit. The data processing system may further include a second counter, the second counter implemented in the processor, wherein a first counter value of the first counter is compared to a second counter value of the second counter to determine if the data stored by the memory has been modified in response to the first command. The memory may be one of a plurality of memories in the data processing system. The data processing system may further include executable code. The data processing system may further include a modification flag, the modification flag being set in response to the first counter being incremented, wherein the modification flag, when set, may prevent any further incrementing of the first counter until after a subsequent secure boot. The memory may include a plurality of memory blocks, wherein each memory block may include a corresponding counter, the corresponding counter for logging modifications to the memory block to which it corresponds.

FIG. 1 illustrates data processing system 10 in accordance with an embodiment. Data processing system 10 is highly simplified, and includes a bus 12, processors 14 and 16, and NVM 18. Note, there may be many other functional blocks in data processing system 10 in an actual implementation. In one embodiment, data processing system 10 may be implemented on a single integrated circuit. Processor 14 includes secure bootloader 20, and counter 22. The functions of counter 22 will be discussed below. Processors 14 and 16 can be any type of processing circuit. For example, processors 14 and 16 may be microprocessors (MPUs), microcontrollers (MCUs), digital signal processors (DSPs), or another type of processor or processor core. Additionally, processors 14 and 16 may be peripheral devices or special-purpose processors used to control peripheral units, such as for example, a direct memory access (DMA) peripheral. Non-volatile memory 18 is bi-directionally connected to processors 14 and 16 through bus 12. Bus 12 can be any type of bus structure, for example, bus 12 may be an advanced high-performance bus (AHB) or an advanced peripheral bus (APB). Counter 22 may be implemented using one-time programmable (OTP) memory or a monotonic counter. Secure bootloader 20 may be used with counter 22. Counter 22 is provided to record the number of times the contents of NVM 18 have been successfully cryptographically verified. Counter 22 may only be accessible to secure bootloader 20.

Figure 2:
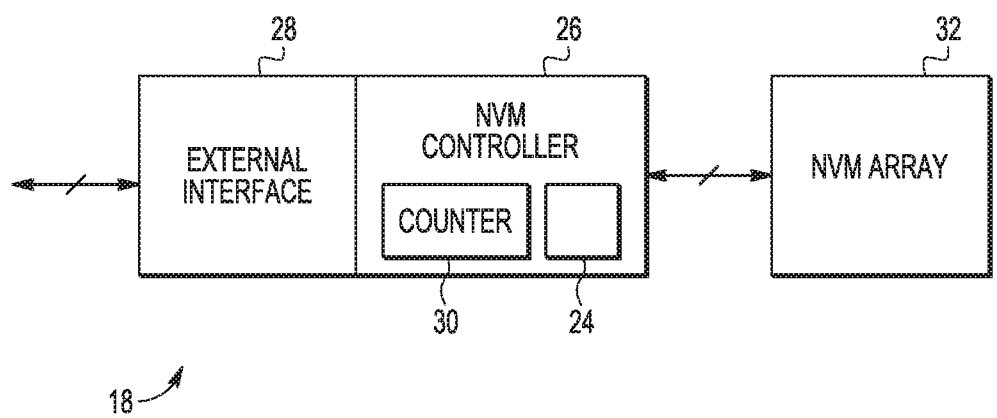
FIG. 2 illustrates the non-volatile memory (NVM) of the data processing system of FIG. 1 in accordance with an embodiment.

FIG. 2 illustrates NVM 18 of data processing system 10 of FIG. 1 in more detail. Non-volatile memory 18 includes NVM controller 26, interface 28, and NVM array 32. External interface 28 is bi-directionally connected to bus 12 and provides control and data access to NVM 18 via bus 12 under the control of NVM controller 26. NVM array 32 may include any type of non-volatile memory cell that can be read from or written to, such as for example, a flash memory cell, a magnetic random access memory (MRAM), a ferro-electric random access memory (RAM), etc. NVM controller 26 interprets control commands from a requester, and accesses memory array 32 for read and write operations. The requester may be a processor connected to bus 12 such as one of processors 14 and 16. NVM controller 26 includes NVM modification flag 24 and counter 30. In one embodiment, NVM modification counter 30 is controlled by the NVM controller and modifications of NVM modification counter 30 is restricted to the NVM controller. In another embodiment, NVM modification flag 24 may be implemented as part of a register file (not illustrated) in data processing system 10. NVM modification flag 24 is set to a predetermined logic state when a command is received by NVM controller 26 that modifies the stored information in NVM array 32. Note, a modification command is a command that causes the information stored in NVM array 32 to be changed or modified. For example, a modification command may be a command that causes a write, program, or erase operation of NVM array 32.

NVM 18 may store information that includes software, firmware, executable code, data, instructions, authentication secrets, etc., and other information used during a secure boot or during normal operation of data processing system 10. The term data, as used herein, may be any type of information stored in a memory, including the above mentioned types of information. The firmware may be encrypted prior to being stored in NVM 18. The advanced encryption standard (AES) is one encryption type commonly used for encryption and decryption. There are also many other encryption/decryption algorithms that may be used. In an attempt to gain control of data processing system 10, the information stored in NVM array 32 may be modified, altered, or replaced by an unauthorized entity. To ensure that data processing system 10 is not powered up or operated with unauthorized data code, data processing system 10 verifies that the information stored in NVM 18 is authorized and has not been replaced or modified.

Figure 3:
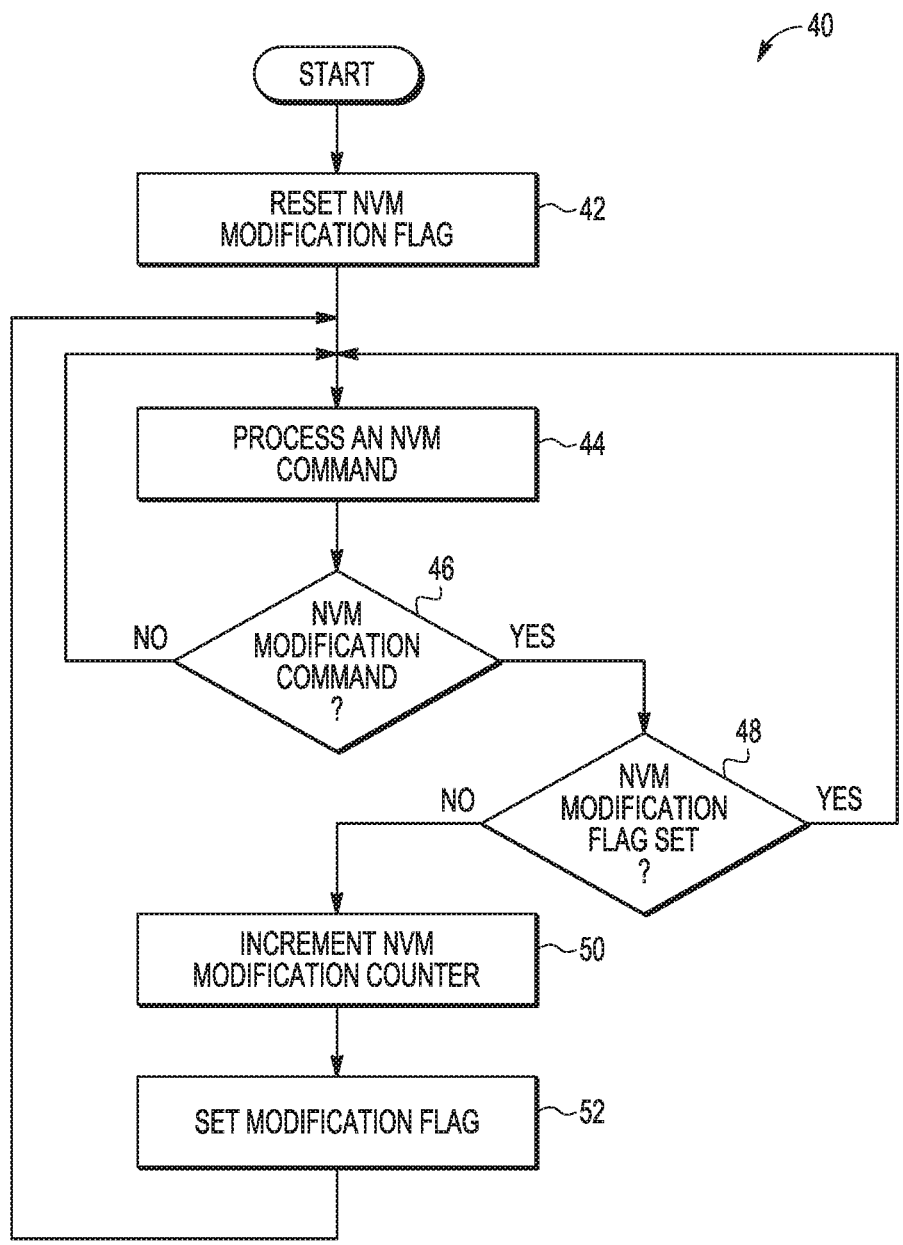
FIG. 3 illustrates a method for monitoring and logging modification commands sent to the NVM in accordance with an embodiment.

FIG. 3 illustrates method 40 for monitoring and logging modification commands sent to a memory of a data processing system in accordance with an embodiment. Method 40 is performed by NVM controller 26 each time data processing system 10 powers up or is reset. At step 42, NVM modification flag 24 (FIG. 2) is reset to a "not set" value at system power-on. In one embodiment, NVM modification flag 24 is reset to a logic low state. At step 44, a command for accessing NVM array 32 is received by NVM controller 26. At decision step 46, it is determined if the received command is a command that would modify the contents of NVM array 32. As stated above, a modification command may be a command that either writes, programs, or erases a portion or all of NVM array 32. If the command is not a modification command, the NO path is taken from decision step 46 back to step 44. If the command is determined to be a modification command, the YES path is taken to decision step 48. At decision step 48, it is determined if NVM modification flag 24 has already been set by a previously received modification command. If modification flag 24 had already been set, then the YES path is taken back to step 44. If modification flag 24 had not been previously set, the NO path is taken to step 50. At step 50, NVM modification counter 30 is incremented by one and logged. NVM modification counter 30 counts and stores each receipt of a NVM modification command that causes modification flag 24 to be set if it had not already been previously set. This ensures that counter 30 is only incremented once for each power up or reset period and thus reduces the number of bits required to implement counters 22 and 30. In another embodiment, the way counter 30 is incremented may be different. At step 52, NVM modification flag 52 is set.

Figure 4:
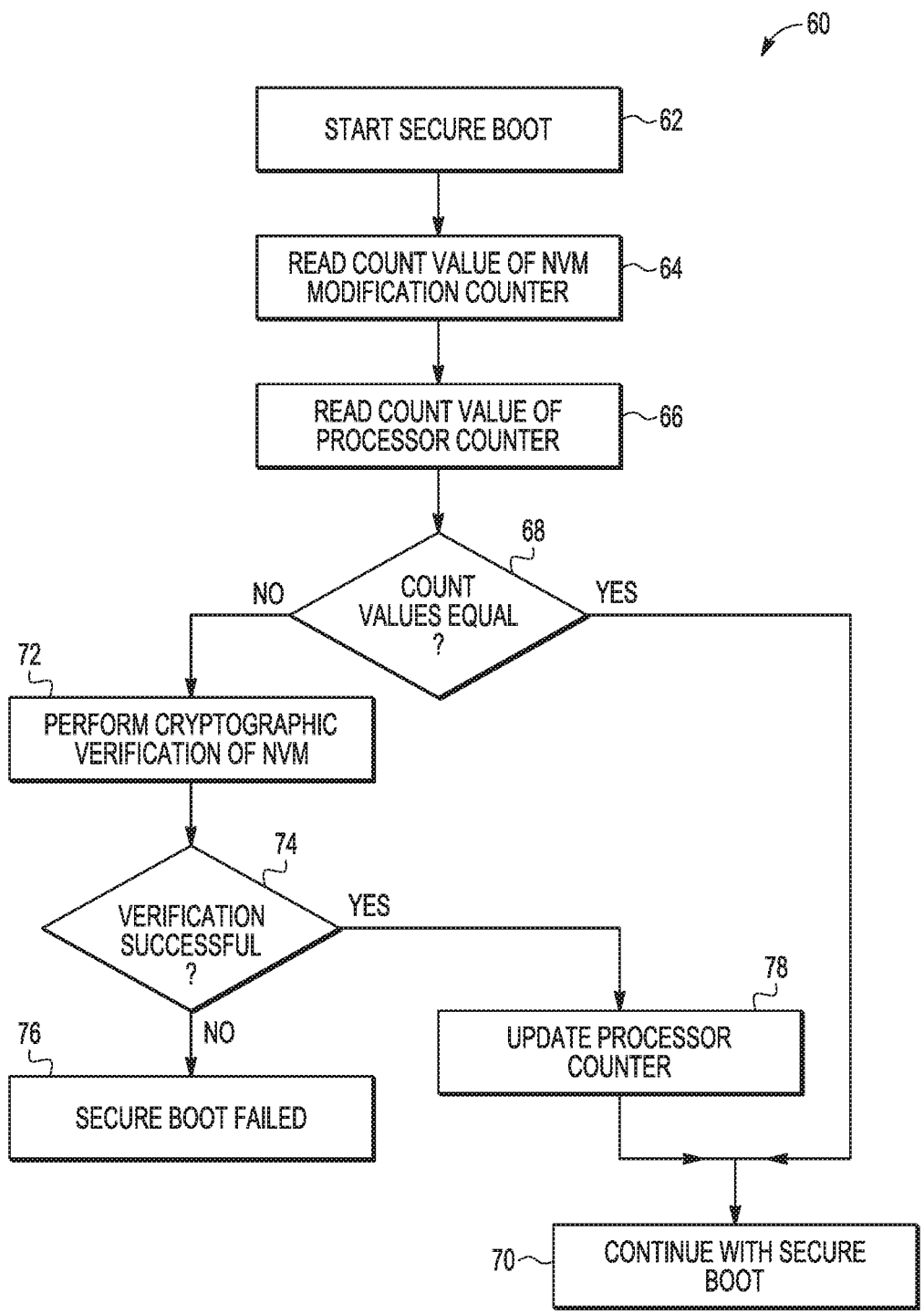
FIG. 4 illustrates a method for monitoring and reporting the receipt of modification commands sent to the NVM.

FIG. 4 illustrates method 60 for verifying the data integrity of NVM array 32 during a secure boot of data processing system 10. At step 62, a secure boot of data processing system 10 begins. At step 64, a count value is read from NVM modification counter 30. Counter 30 is controlled by NVM controller 26 and may be incremented as described above in the discussion of FIG. 3. The count value from counter 30 indicates how many power-on or boot cycles included reception of a NVM modification command by NVM controller 26. At step 66, a count value is read from counter 22 in processor 14. The count value from counter 22 indicates how many times the contents of NVM array 32 have been cryptographically verified and trusted. Counter 22 is under the control of processor 14. At decision step 68, it is determined if the two count values are equal to each other. To determine if the two count values are equal, a comparator (not shown) such as an exclusive OR logic gate may be used. If the two count values are equal, then there has been no new modifications to the contents of NVM array 32 since the last cryptographic verification, and the YES path is taken from decision step 68 to step 70. At step 70, the secure boot process continues. However, if the NO path is taken from decision step 68 to step 72, then the contents of NVM array 32 has been modified. It is not known if the modification is authorized or not. Therefore, at step 72, a cryptographic integrity verification is performed on NVM array 32. As mentioned above, the cryptographic integrity verification of the data may take a significant amount of time to complete.

In one embodiment, the secure boot mechanism may be implemented with digital signature verification or similar cryptographic operation to verify the NVM contents. The contents of the NVM is signed by an authorized entity and the signature is stored. A hash of the contents of NVM array 32 is then computed. The cryptographic nature of the hash is checked to validate the signature of the hash. The signature verification of the NVM content is used to provide the cryptographic verification of the memory contents. This cryptographic verification is computationally intensive and takes a certain time to complete. The time increases with the increasing size of the memory, and the verification is performed every time the secure data processing system undergoes a secure boot. In another embodiment, the cryptographic verification may be performed differently. If NVM array 32 is successfully verified, then the YES path is taken to step 78 and counter 22 is incremented. If the verification is not successful, meaning the modification of the contents of NVM array 32 was not authorized, then the NO path is taken to step 76 and the secure boot has failed.

The use of method 60 during secure boot of the data processing system results in much faster boot times when a NVM modification command (such as for a write or erase) is not received and the count values of counters 22 and 30 are equal. The boot times are faster because the verification step can be bypassed.

Figure 5:
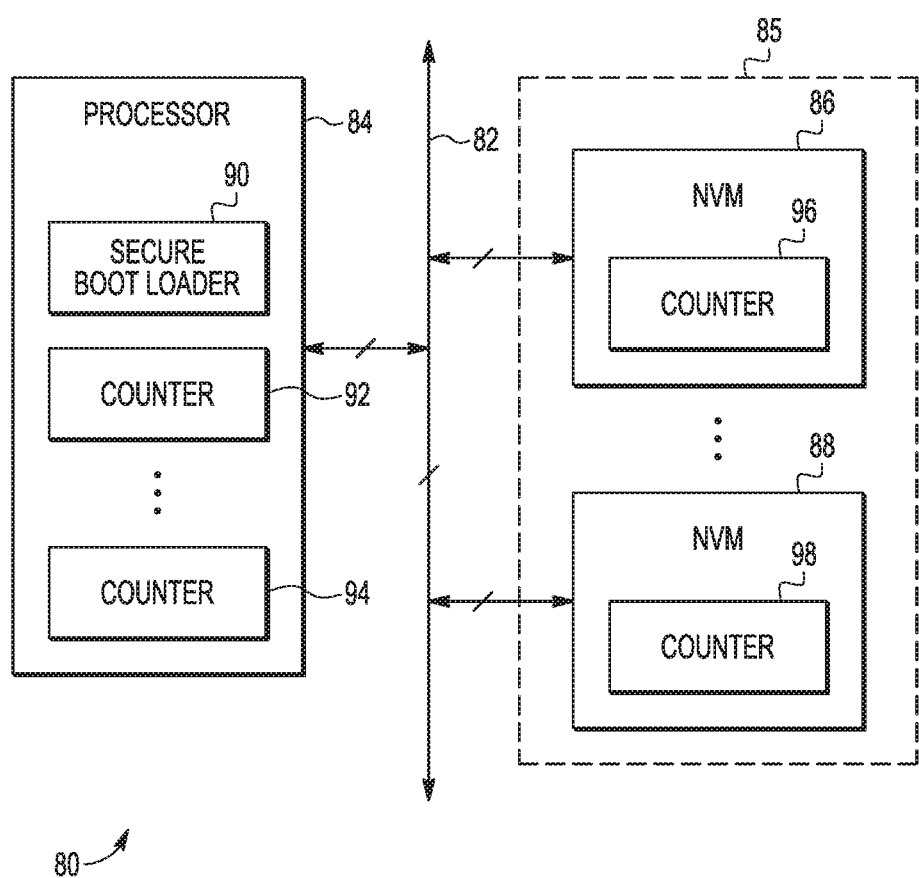
FIG. 5 illustrates a data processing system in accordance with another embodiment.

FIG. 5 illustrates data processing system 80 in accordance with another embodiment. Data processing system 80 is highly simplified and includes bus 82, processor 84, and NVM 85. Data processing system 80 may be implemented on a single integrated circuit. Processor 84 includes secure bootloader 90 and a plurality of counters including counters 92 and 94. Counters 92 and 94 may be implemented as OTP memory or monotonic counters. Processor 84 can be any type of processor such as a microprocessor (MPU), microcontroller (MCU), digital signal processor (DSP), or other type of processor or processor core. NVM 85 is bi-directionally connected to processor 84 through bus 82. Bus 82 may be the same as bus 12 (FIG. 1). NVM 85 includes a plurality of NVM partitions represented by NVM partitions 86 and 88. Each NVM partition includes a counter. For example, NVM 86 includes counter 96 and NVM 88 includes counter 98. There are the same number of counters as there are NVM partitions that need to be individually trusted, where one counter in NVM 85 is assigned to and corresponds with one NVM partition. In the illustrated embodiment, there is a one-to-one correspondence between counters 92 and 94 in processor 84 to counters 96 and 98 in NVM 85. Note, for purposes of this description, the words partition, block, sector, section, and the like are interchangeable when referring to the NVM partitions 86 and 88.

The different NVM blocks record modifications separately, but in the same way as described above for data processing system 10. The embodiment of FIG. 5 separately assigns the plurality of counters to the plurality of NVM blocks, and independently trusts the plurality of NVM blocks. This provides the same benefits and advantages as described above regarding the embodiment of FIG. 1. And in addition to the above mentioned advantages, secure bootloader 90 is provided with the flexibility of treating the different NVM blocks differently based on the application.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for performing a secure boot of a data processing system, the method comprising:
   processing a command issued from a processor of the data processing system, the command directed to a memory;
   determining that the command is a command that causes the memory to be modified by determining that a first counter value of a first counter is not equal to a second counter value of a second counter, wherein the first counter is under control of the memory controller of the memory and the second counter is under control of the processor;
   performing cryptographic verification of the memory in response to the first and second counter values not being equal; and
   incrementing the first counter in response to the determining that the command is a command that causes the memory to be modified.

2. The method of claim 1, wherein the memory is characterized as being a non-volatile memory.

3. The method of claim 1, further comprising incrementing a second counter in response to the cryptographic verification of the memory being successful.

4. The method of claim 1, further comprising setting a modification flag to a first logic state in response to incrementing the first counter, wherein the set modification flag indicating that the memory has been modified so that the first counter is not incremented for subsequent modification commands.

5. The method of claim 4, further comprising resetting the modification flag to a second logic state in response to a subsequent restart of the data processing system.

6. The method of claim 1, wherein the memory and the processor are implemented together on a single integrated circuit.

7. The method of claim 1, further comprising halting the secure boot of the data processing system in response to the cryptographic verification of the memory indicating that the modification of the memory had been unauthorized.

8. A method for performing a secure boot of a data processing system, the method comprising:
   processing commands issued from a processor of the data processing system, the commands directed to a memory of the data processing system;
   incrementing a first counter when a command is a command that causes the memory to be modified, incrementing a second counter in response to a cryptographic verification of the memory; and
   during the secure boot, comparing the first counter value to the second counter value and continuing with the secure boot from the memory without performing the cryptographic verification of the memory in response to determining that the first counter value equals the second counter value, and wherein in response to determining that the first and second count values are not equal, performing the cryptographic verification.

9. The method of claim 8, wherein determining if the first command is a command that causes the memory to be modified further comprises determining if the first counter has been incremented since a previous secure boot of the data processing system.

10. The method of claim 8, further comprising setting a modification flag in response to incrementing the first counter, wherein the setting of the modification flag prevents the first counter from being further incremented while the modification flag is set.

11. The method of claim 8, wherein the memory comprises a plurality of memory blocks, and wherein each memory block of the plurality of memory blocks has a corresponding counter, and wherein incrementing the first counter further comprises incrementing a counter corresponding to a memory block of the plurality of memory blocks that has been modified in response to a command.

12. A data processing system comprising:
   a processor having a bootloader for loading data used by the data processing system;
   a memory coupled to the processor, the memory for storing the data loaded by the bootloader;
   a first counter coupled to a memory controller of the memory, the first counter being incremented by the memory controller in response to a command being determined to be a command that modifies the data stored by the memory; and
   a second counter implemented in the processor, wherein a counter value of the second counter is compared to a counter value of the first counter, and wherein in response to determining that the second counter value is not equal to the first counter value, performing a cryptographic verification of the memory.

13. The data processing system of claim 12, wherein the data processing system is implemented on a single integrated circuit.

14. The data processing system of claim 12, wherein the memory is one of a plurality of memories in the data processing system.

15. The data processing system of claim 12, wherein the data further comprises executable code.

16. The data processing system of claim 12, further comprising a modification flag, the modification flag being set in response to the first counter being incremented, wherein the modification flag, when set, prevents any further incrementing of the first counter until after a subsequent secure boot.

17. The data processing system of claim 12, wherein the memory comprises a plurality of memory blocks, wherein each memory block comprises a corresponding counter, the corresponding counter for logging modifications to the memory block to which it corresponds.

* * * * *